Sept. 20, 1932.  A. HUDEC ET AL  1,878,443
CULTIVATOR ATTACHMENT
Filed Oct. 27, 1931  2 Sheets-Sheet 1

Inventors
A. Hudec
T. T. Sefcik
By Clarence A. O'Brien
Attorney

Sept. 20, 1932. A. HUDEC ET AL 1,878,443
CULTIVATOR ATTACHMENT
Filed Oct. 27, 1931 2 Sheets-Sheet 2
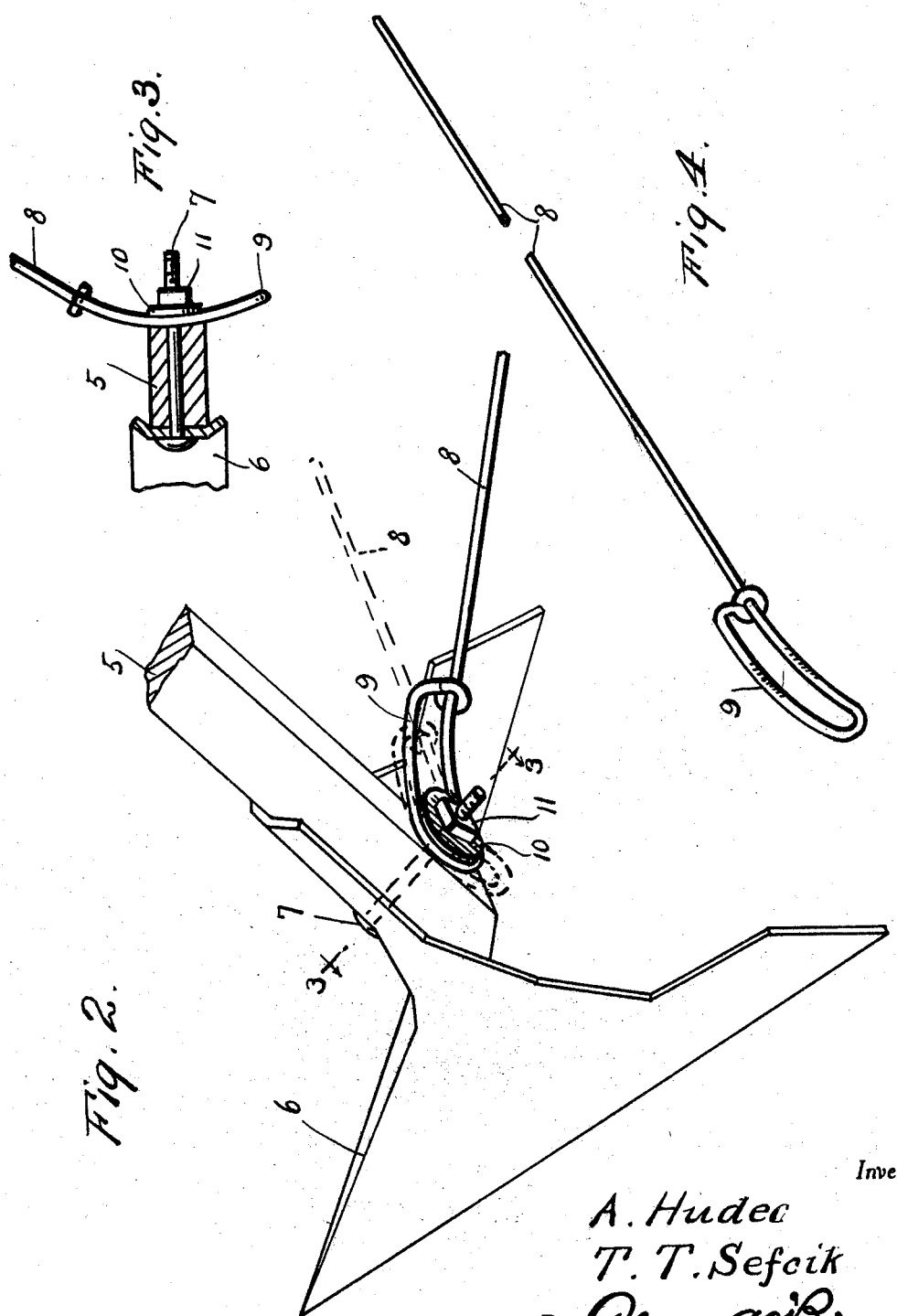
Inventors
A. Hudec
T. T. Sefcik
By Clarence A. O'Brien
Attorney Patented Sept. 20, 1932

1,878,443

UNITED STATES PATENT OFFICE

ANTON HUDEC AND THOMAS T. SEFCIK, OF TEMPLE, TEXAS

CULTIVATOR ATTACHMENT

Application filed October 27, 1931. Serial No. 571,387.

The present invention relates to an attachment for cultivators and is called a grass getter and the object of the invention is to provide means for destroying grass and other plant life growing between rows of plants which are being cultivated.

Another important object of the invention resides in the provision of an attachment of this nature which is exceedingly simple in construction, inexpensive to manufacture, strong and durable, easy to apply, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 2 is a perspective view of the sweep of a cultivator showing one of the devices attached thereto.

Figure 3 is a sectional view taken substantially on the line 3—3 of Figure 2, and Figure 4 is a perspective view of the devices.

Figure 1:
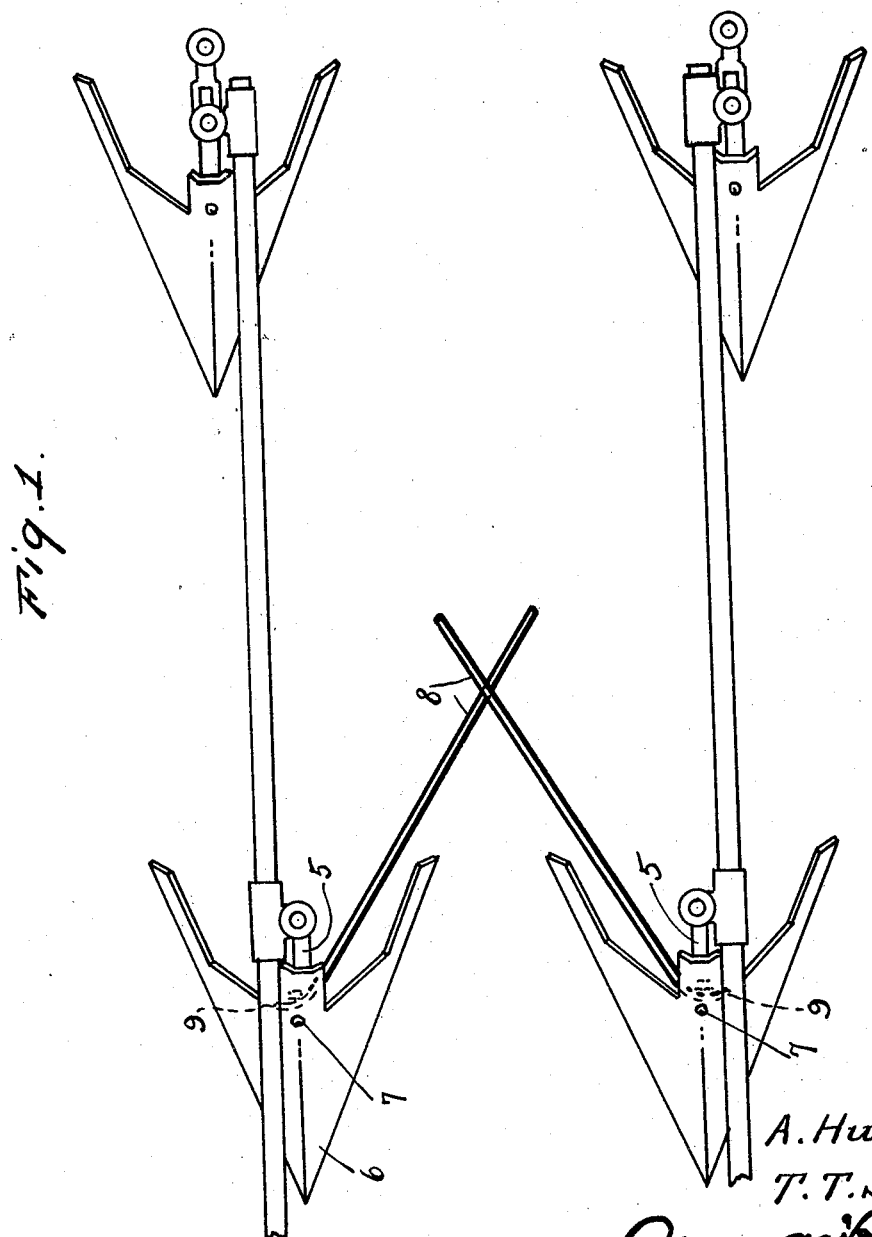
Figure 1 is a top plan view of a pair of the devices mounted on sweeps of a cultivator.

Referring to the drawings in detail it will be seen that numerals 5 denote shanks on which are mounted the front pair of sweeps 6 being bolted in place as at 7. Numerals 8 denote elongated spring steel rods being formed at their forward ends with elongated oblong longitudinally curved loops 9 which are mounted on the bolts 7 by means of washers 10 and nuts 11 so that the straight rods 8 converge rearwardly toward each other and cross each other as is indicated to advantage in Figure 1. The two grass getters, therefore, intersect back of the two front sweeps in the middle of the row being cultivated, and in actual practice reach about six or eight inches beyond the intersections.

The two instruments go about one inch in the ground which covers the entire rod thus causing them to pull out all of the weeds and grass growing between the stalks or plants and in such places not covered by the sweeps. The curved loops govern the angle at which the device may be set on the shank.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and in the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

An attachment for cultivators comprising a pair of elongated rods and means for adjustably attaching the forward end of each rod to the rear of a conventional sweep-shank by the bolt and nut usually retaining the sweep on said shank so that the rods converge rearwardly with their rear ends crossing each other, said means comprising a longitudinally elongated curved loop on the said forward end of each rod through which the said bolt extends, and a washer on the bolt between the said loop and the said nut for holding the loop in desired adjusted position against the rear edge of the respective shank.

In testimony whereof we affix our signatures.

ANTON HUDEC.
THOMAS T. SEFCIK.